(12) United States Patent
Kawasaki et al.

(10) Patent No.: US 8,340,082 B2
(45) Date of Patent: Dec. 25, 2012

(54) TRANSMISSION METHOD AND APPARATUS

(75) Inventors: Yoshihiro Kawasaki, Kawasaki (JP);
Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 892 days.

(21) Appl. No.: 12/428,026

(22) Filed: Apr. 22, 2009

(65) Prior Publication Data

US 2009/0207836 A1    Aug. 20, 2009

Related U.S. Application Data

(63) Continuation of application No. PCT/JP2006/321362, filed on Oct. 26, 2006.

(51) Int. Cl.
*H04L 12/66* (2006.01)
(52) U.S. Cl. ........ 370/352; 370/351; 370/401; 370/389; 370/474; 370/328; 370/338
(58) Field of Classification Search .............. 370/351, 370/352, 474, 389, 328, 338, 401
See application file for complete search history.

(56) References Cited

U.S. PATENT DOCUMENTS

| 5,537,398 A | 7/1996 | Siwiak |
| 2006/0128309 A1 | 6/2006 | Dateki et al. |
| 2006/0189279 A1 | 8/2006 | Kobayashi et al. |
| 2006/0193394 A1 | 8/2006 | Tanaka et al. |
| 2007/0195749 A1 | 8/2007 | Kakimoto |

FOREIGN PATENT DOCUMENTS

| CN | 1184571 | 6/1998 |
| JP | 11-261519 | 9/1999 |
| JP | 2002-354537 | 12/2002 |
| JP | 2003-134093 | 5/2003 |
| JP | 2005-260649 | 9/2005 |
| JP | 2005-333589 | 12/2005 |
| JP | 2006-173834 | 6/2006 |
| JP | 2006-245702 | 9/2006 |
| WO | 2005/015799 | 2/2005 |

OTHER PUBLICATIONS

International Search Report dated Jan. 15, 2007 for corresponding International Application No. PCT/JP2006/321362.
3GPP TR 25.814 V7.1.0 (Sep. 2006) 3rd Generation Partnership Project; Technical Specification Group Radio Access Network; Physical layer aspects for evolved Universal Terrestrial Radio Access (UTRA) (Release 7); Sophia Antipolis Valbonne, France; Dated: Sep. 2006.
Korean Intellectual Property Office "Notice of Preliminary Rejection" for corresponding Korean Patent Application No. 10-2009-7003056, mailed Aug. 9, 2010. English translation attached.
Japanese Patent Office "Notification of Reason for Refusal" issued for corresponding Japanese Patent Application No. 2008-540851, dispatched Sep. 13, 2011. English translation attached.
The State Intellectual Property Office of China "First Notification of Office Action and Text of the First Office Action" issued for corresponding Chinese Patent Application No. 200680055988.5, issued Sep. 7, 2011. English translations attached.

*Primary Examiner* — Asad Nawaz
*Assistant Examiner* — Khaled Kassim
(74) *Attorney, Agent, or Firm* — Myers Wolin, LLC

(57) ABSTRACT

A voice packet transmission method and apparatus for transmitting a voice packet with a header, wherein a voice packet with a compressed header is transmitted, monitoring is performed to detect whether a necessity to send a voice packet with an uncompressed header is generated during the transmission, the voice packet data with an uncompressed header is divided into a plurality of portions when the necessity is generated, and each divided data is transmitted via different antennas by spatial multiplexing.

6 Claims, 18 Drawing Sheets

FIG. 9

| CONTROL SIGNAL | TRANSMISSION METHOD USED FOR SUBSEQUENT VOICE PACKET | REMARKS |
|---|---|---|
| 00 | SPATIAL 1 MULTIPLEX OR TRANSMISSION DIVERSITY (FIRST TRANSMISSION METHOD USING LOW ENCODING RATE) | |
| 01 | SPATIAL 2 MULTIPLEX (SECOND TRANSMISSION METHOD USING LOW ENCODING RATE) | TRANSMISSION OF VOICE PACKET WITH UNCOMPRESSED HEADER |
| 10 | | RESERVE |
| 11 | SPATIAL 1 MULTIPLEX OR TRANSMISSION DIVERSITY (FIRST TRANSMISSION METHOD USING HIGH ENCODING RATE) | TRANSMISSION OF VOICE PACKET WITH UNCOMPRESSED HEADER |

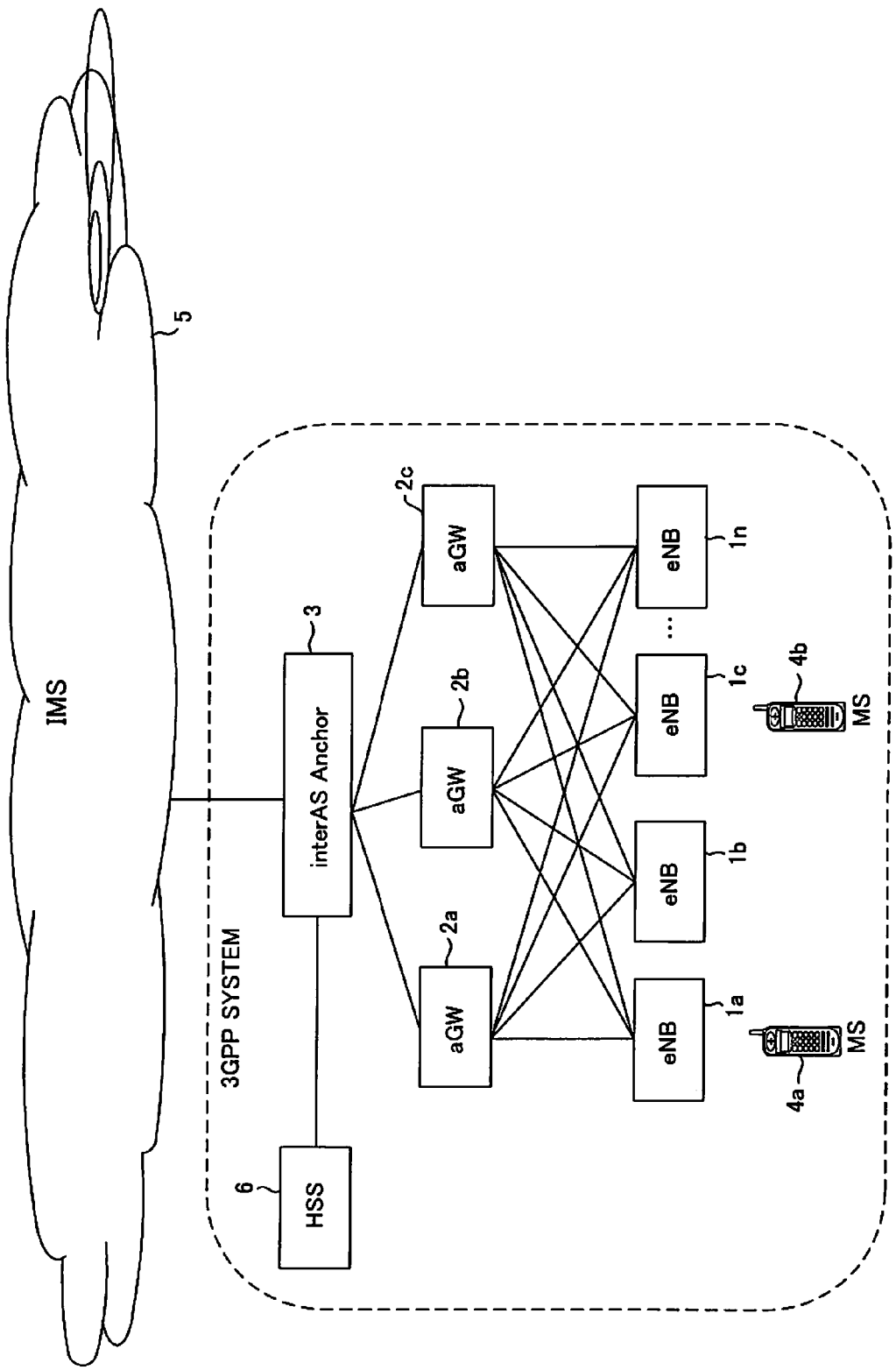

FIG. 16 PRIOR ART
(A) 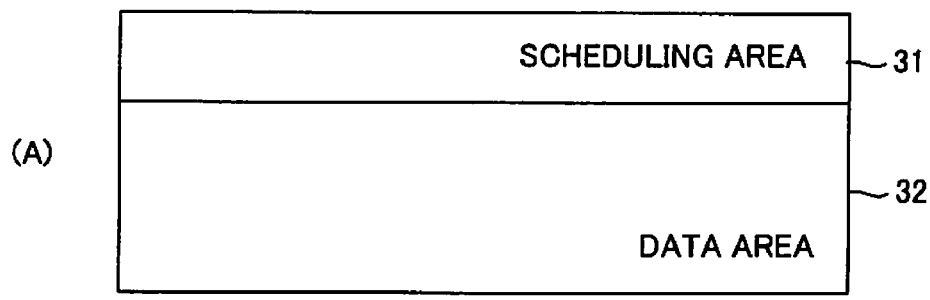
(B) 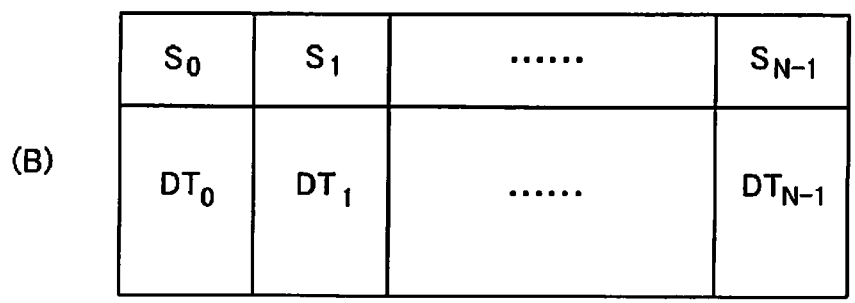
(C) 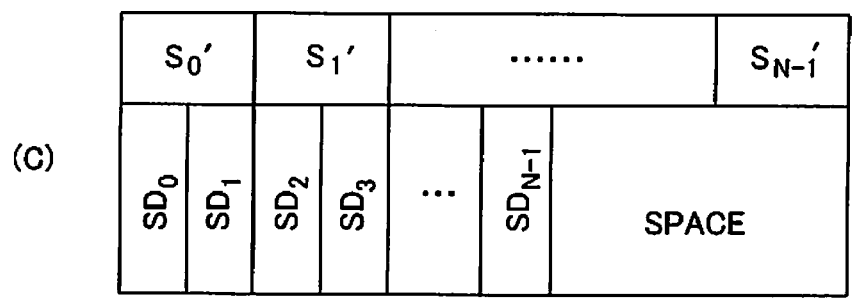
(D) 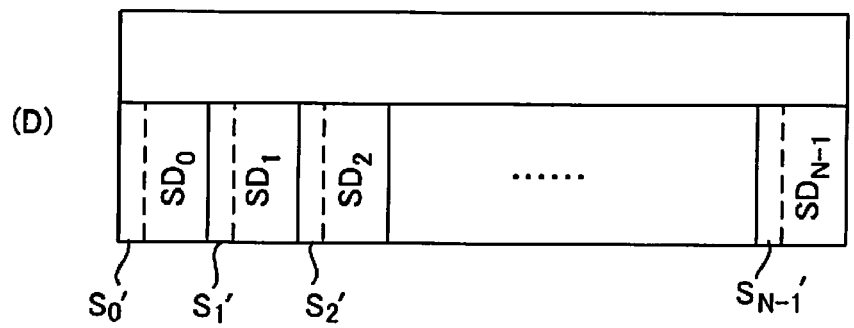

TRANSMISSION METHOD AND APPARATUS

CROSS-REFERENCE TO RELATED APPLICATIONS

This application is a continuation application of international PCT application No. PCT/JP2006/321362 filed on Oct. 26, 2006, now pending, the contents of which are herein wholly incorporated by reference.

BACKGROUND OF THE INVENTION

The present invention relates to a transmission method and apparatus of a voice packet, for example, and more particularly to a transmission method and apparatus which is suitably used for a voice packet transmission which switches a transmission method for a voice packet with a header, depending on whether the header is compressed or not.

Evolved UTRAN System

As a communication system today, systems using IP (Internet Protocol) and related protocols thereof are being constructed because of easy handling and cost, and there is a tendency that voice data is transmitted more and more using packets, not only in a cable system, but also in a radio space of a radio system.

When voice data is assembled into packets, voice encoding processing is performed on voice waveforms every 20 ms, for example. An RTP/UDP/IP (Real-Time Protocol/User Data Protocol/Internet Protocol) header is added to the encoded voice data payload, and transmitted as a voice packet. In a size of a voice packet per 20 ms, a ratio of the header is high, and in IPv6, the size of the IP header increases even more compared with IPv4.

FIG. 10 is a block diagram depicting an EUTRAN (Evolved UTRAN) system, under development by the standardization group 3GPP, is comprised of eNB (evolved-UTRAN Node B) 1a to 1n, which are base stations, access gateway aGW (evolved-UTRAN Access Gateway) 2a to 2b, which controls a group of base stations, and IASA (Inter Access System Anchor) 3, which is an anchor of the entire network. The base stations eNB 1a to 1n have functions similar to a conventional base station NB and radio network controller RNC, and aGW 2a and 2b transfer messages between the user terminals 4a and 4b and IASA 3. IASA 3, which has functions of a router, is connected to IMS (IP Multimedia System) 5, and to HSS (Home Subscriber Server) 6 for storing profiles of subscribers. A header portion of a voice packet is compressed in PDCP (Packet Data Convergence Protocol) function units in aGW (access Gate Way). A header is further added to the voice packet in RLC and MAC layers of the base stations, but the size of the voice packet becomes considerably small by RTP/UDP/IP header compression in PDCP function units.

Protocol Stack and Header Compression

FIG. 11 is a diagram depicting a protocol stack of U-plane Data in the user terminal (UE) 4, base station apparatus (eNB) 1 and aGW 2, which consists of four layers: a physical layer (PHY), MAC (Medium Access Control) layer, RLC (Radio Link Control) layer, and PDCP (Packet Data Convergence Protocol) layer. Data transmission and reception is executed in the PDCP layer between the user terminal (UE) 4 and aGW 2, and data is transmitted/received in the RLC layer between the user terminal 4 and base station 1. The major functions of each protocol are as follows.

(1) PDCP: In the PDCP layer, the transmission side compresses the header of the higher protocol, attaches a sequence number, and sends the data. The receive side checks the sequence number, whereby discard processing for redundant reception is executed. Retransmission is not performed in the PDCP layer.

FIG. 12 is a diagram depicting header compression, where (A) of FIG. 12 is a packet before header compression, in which IPv4 header (or IPv6 header) H1, UDP header H2 and RTP header H3 are attached to a voice payload PL, and (B) of FIG. 12 is a packet after header compression, in which the compressed header Hc is attached to the voice payload PL.

In the beginning, a packet, where headers H1 to H3 are attached to the voice data payload PL which is voice-encoded every 20 ms, is transmitted. The content of each header is divided into a portion to be unchanged and a portion to be changed. Therefore by attaching the entire content of the header to the voice payload PL and sending it only for a first time, and then attaching only the content to be changed to the voice payload, the header portion can be compressed. For example, the header portion size can be compressed down to about a 1 byte size in a case where only the RTP sequence number is sent all the time. However, if a transmission error occurs or if the content to be transmitted in a header is partially changed during transmitting voice payload with the compressed header Hc attached, the receive side cannot restore the header before compression using the compressed header. In such a case, the transmission side must send the uncompressed full size header. If restoring the header fails, the receive side sends feedback to the transmission side, and notifies the failure of header restoration in the receive side.

(2) RLC: The RLC layer has a layer having a retransmission function, and a new sequence number in the RLC layer is attached based on the sequence number attached to the data from PDCP, and this data is sent. Using this sequence number, the receive side notifies the transmission confirmation signal (Ack/Nack signal) to indicate normal reception/abnormal reception of data to the transmission side. The transmission side discards the data being held if the Ack signal is returned, or retransmits the data being held if the Nack signal is returned.

(3) MAC: The MAC layer is a layer to multiplex/demultiplex data in the RLC layer. In other words, the transmission side multiplexes data in the RLC layer to generate transmission data, and the receive side demultiplexes the receive data in the MAC layer into data in the RLC layer.

(4) PHY: The PHY layer is a layer to transmit/receive data via radio between the user terminal 4 and the base station 1, and converts the MAC layer data into radio data, or converts the radio data into MAC layer data.

Transmission Method and Subframe in Radio Blocks

In the downlink of the radio access portion of the Evolved UTRAN system, OFDM (Orthogonal Frequency Division Multiplex) is used. FIG. 13 is a diagram depicting a subframe in the downlink of the radio access portion of EUTRAN, in which the abscissa is the frequency (transmission band of the downlink), and the ordinate is the time, and five subframes are shown. Each subframe is comprised of a predetermined number of OFDM symbols, which are not illustrated. In the diagram, common pilots appear only in the front of every subframe. However, actually common pilots are included in common control signal region and individual data region as well.

An OFDM signal in the 20 MHz width radio transmission band (system transmission band) is sent by 1201 subcarriers. This 20 MHz width transmission band is divided into about 100 subbands (or Resource Blocks), and one or a plurality of subbands is/are used for data transmission to a terminal. It is assumed that one subband (or Resource Block) consists of 12 subcarriers. A subframe length is 1 ms, and a common pilot is sent through the entire system transmission band.

Each subframe SF includes a common pilot CPL, common control signal CCS, individual data addressed to each terminal UDT, individual control data UCT or voice data. The common pilot CPL is used for SIR measurement and synchronous demodulation at the receive side, and common control signal CCS is a control signal common to all terminals, and includes user data position information. The user data position information is information to notify the subcarrier or subband in which the user data is sent, to the terminal, and the terminal checks whether data addressed to this terminal exists, referring to this position information, and if it exists, the terminal receives the individual data/control signal UDT/UCT or voice signal addressed to this terminal from the specified subband.

OFDM Transmission/Receive System

FIG. 14 is a block diagram depicting a transmission apparatus in an OFDM communication system. A data modulation unit 11 modulates transmission data (user data or control data) based on QPSK/16QAM/64QAM data modulation, for example, and converts it into complex base band signals (symbols) having in-phase components and quadrature components. A time division multiplex unit 12 multiplexes pilot data of a plurality of symbols into data symbols using time and frequency division multiplexing. A serial to parallel conversion unit 13 converts the input data into M symbols of parallel data, and outputs M number of subcarrier samples. An IFFT (Inverse Fast Fourier transform) unit 14 performs IFFT (Inverse Fast Fourier Transform) processing on the subcarrier samples which are input in parallel, combines the results of the IFFT processing into a discrete time signal (referred to as an OFDM signal), and outputs it. A guard interval insertion unit 15 inserts a guard interval into the M symbols of the OFDM signal which is input from the IFFT unit, a transmission unit (TX) 16 converts the OFDM signal in which the guard interval is inserted from digital to analog, converts the frequency of the OFDM signal from the base band to a radio band, amplifies it, and sends it via a transmission antenna 17.

FIG. 15 is a block diagram of an OFDM receive apparatus. A signal which is output from a transmission antenna 7 is received by a receive antenna 18 of the receive apparatus via a fading channel (transmission line), and a receive circuit (Rx) 19 converts the RF signal received by the antenna into a base band signal, converts this base band signal from analog into digital, and outputs it. An FFT timing synchronous circuit 20 detects an FFT timing using a time domain signal which is output from the receive circuit 19, and a symbol generating unit 21 deletes GI, and generates an OFDM symbol at this FFT timing, and inputs it to the FFT unit 22. The FFT unit 22 performs FFT processing on each generated OFDM symbol, and converts it into subcarrier samples $S_0$ to $S_{M-1}$ in a frequency domain. A channel estimation circuit 23 calculates correlation of pilot symbols which are received with a predetermined interval and a known pilot pattern, whereby a channel estimation is performed for each subcarrier, and a channel compensation circuit 24 compensates the channel fluctuation of data symbols using the channel estimation value. By the above mentioned processing, transmission data distributed to each subcarrier is demodulated. Hereafter the demodulated subcarrier signal is converted into serial data, and is then decoded, although this is not illustrated.

Persistent Scheduling

In the radio systems of the future, it will be common to perform packet transmission in radio blocks based on scheduling. There are two types of data: RT (Real-Time) data in which the delay characteristic is most important; and NRT (Non-Real-Time) data in which throughput is most important.

In the case of a voice data packet which is transmitted with a predetermined interval, it is inefficient to send the data based on the scheduling that decides the transmission timing or the place (subband) in the frequency domain in packet units for each transmission, but it is efficient to send voice data packets at a predetermined period and place. This is because a control signal to indicate such information as the transmission timing and place, used for transmission of a voice packet, need not be sent for each voice packet.

It is also inefficient to send a voice data packet based on the scheduling that decides the modulation method and encoding rate in packet units. This is because the size of the voice packet data having a compressed header is small, so if the data is sent by changing the modulation method and encoding rate in packet units, the relative size of the control signal to indicate the modulation method and encoding rate used for the voice packet becomes too large with respect to the size of the voice packet.

This aspect is described using the example in FIG. 16. As (A) of FIG. 16 shows, a subframe has a control signal area 31 where scheduling information (timing, place in frequency domain, modulation method, encoding rate) is mapped, and a data area 32 where individual data and voice data are transmitted. The size of the control signal area 31 is limited, and if it is assumed that only a maximum N number of scheduling information $S_0$ to $S_{N-1}$ can be mapped, as shown in (B) of FIG. 16, then data (individual data and voice data) $DT_0$ to $DT_{N-1}$ addressed to only a maximum N number of terminals can be mapped in the data area 32. If it is non-real-time data, of which data size is large, the data area 32 becomes full before the number of data reaches N, and the data can be transmitted by fully using this data area. In the case of compressed voice packet data, of which data size is small, on the other hand, N or more number of voice packet data can be mapped in the data area 32. However since only a maximum N number of scheduling information $S_0$, to $S_{N-1}$, can be mapped in the control signal area 31, as (C) of FIG. 16 shows, voice packet data $SD_0$ to $SD_{N-1}$ addressed to only N number of terminals can be mapped in the data area 32, and space is generated in the data area 32, which makes data transmission inefficient.

A possible method is to map scheduling information in the control signal area 31 only when communication is first started, and include the scheduling information in the voice data thereafter, as shown in (D) of FIG. 16. According to this method, data can be transmitted fully utilizing the data area 32. However efficiency is not good, since the size of the scheduling information $S_0$, to $S_{N-1}$, is large.

Because of this, the following method has been proposed. When a voice packet is transmitted, the time axis is delimited with a predetermined time length, a transmission timing (period) of a voice packet PKT to be transmitted and a transmission place in the frequency domain are fixed in each time block T1, T2, T2, . . . , and a modulation method and encoding rate to be applied to a voice packet which is transmitted within the time block are decided and fixed, as shown in FIG. 17. And it is enabled to change the transmission timing, transmission place, demodulation method, encoding rate, transmission power or the like within each time block. Hence the information on the transmission timing, transmission place, modulation method, encoding rate and transmission power is specified in the time block by a control signal CS, which is attached to a voice packet PKT in the beginning of the time block, and sent.

In the case of using this transmission method, if a control signal to indicate the transmission method, modulation method or the like, which is transmitted in each time block, is received within the time block once, the receive side of the voice packet PKT can receive only the voice packet PKT thereafter within this time block, and transmission efficiency is improved. The standardization group 3GPP refers to this transmission method as a "voice packet transmission" based on persistent scheduling (Non-patent Document 1: 3GPP TR25.814). The control signal CS is attached to the voice packet PKT in the higher layer.

In FIG. 17, the control signal CS is attached to the first voice packet in a time block, but as FIG. 18 shows, the transmission timing, transmission place, modulation method, encoding rate and transmission power in the subsequent time block may be specified by the control signal CS attached to the last voice packet PKT in a time block.

FIG. 19 is a diagram describing a voice packet being transmitted in a predetermined period and in a same subcarrier (subband) in a time block. A voice packet PKT1 addressed to a terminal 1 is transmitted in a frequency band F1 in a time period T11, and a voice packet PKT2 addressed to a terminal 2 is transmitted in a frequency band F2 in a time period T22.

Problems

In EUTRAN, an RTP/UDP/IP header is compressed in PDCP function units in aGW, but a header attached at least to the first voice packet cannot be compressed. Then the RTP/UDP/IP header of each subsequent voice packet is compressed, but as described in connection with FIG. 12, a situation to require transmitting an uncompressed full sized header occurs non-periodically. Generally a size of a voice packet in which an uncompressed full sized header is attached is slightly less than double the size of a voice packet in which a compressed header is attached.

In the voice packet transmission method described in FIG. 17, if a situation to require transmitting a large sized voice packet in which a full sized header is attached suddenly occurs while a small sized voice packet of which header is compressed is being transmitted in a predetermined frequency band, transmission is disabled since a frequency band to transmit this large sized voice packet is not secured.

Unless this voice packet with a full sized header is transmitted, the header attached to the subsequent voice packet cannot be compressed. If a large frequency band is secured so that a voice packet with a fill sized header can be transmitted, on the other hand, unnecessary space must be secured when a small sized voice packet with a compressed header is transmitted, so a radio resource is wasted, and the significance of header compression is lost.

SUMMARY OF THE INVENTION

With the foregoing in view, it is an object of the present invention to enable transmission of a large sized voice packet with a full sized header even if a situation to send a large sized voice packet suddenly occurs.

It is another object of the present invention to enable transmission of a voice packet with a full sized header even if a large frequency band to transmit a voice packet with a full sized header is not secured when a small sized voice packet with a compressed header is transmitted.

It is still another object of the present invention to enable a transmission apparatus to transmit data which cannot be transmitted in a predetermined transmission area, even if the transmission apparatus is notified to transmit data in a predetermined transmission area in a predetermined period, using a predetermined modulation method and predetermined rate.

The present invention is a voice packet transmission method and a voice packet transmission apparatus for transmitting a voice packet with a header.

A first voice packet transmission method according to the present invention has a step of transmitting a voice packet with a compressed header, a step of monitoring whether a necessity to send a voice packet with an uncompressed header is generated during the above mentioned transmission, a step of dividing the voice packet data with the uncompressed header into a plurality of portions when this necessity is generated, and a step of transmitting each divided data via different antennas by spatial multiplexing.

A second voice packet transmission method according to the present invention has a step of encoding a voice packet data with a compressed header using a first encoding rate, a step of transmitting the encoded voice packet with the compressed header, a step of monitoring whether a necessity to send a voice packet with an uncompressed header is generated during the above mentioned transmission, and a step of encoding the data of the voice packet with an uncompressed header in use of a second encoding rate, which is greater than the first encoding rate, and transmitting the encoded voice packet data when this necessity is generated.

A first voice packet transmission apparatus according to the present invention has: two or more transmission units for transmitting voice packet data; two or more antennas for transmitting radio signals which are input from each transmission unit into a space; a detection unit for detecting whether a necessity to send a voice packet with the uncompressed header is generated during transmitting a voice packet with a compressed header; and a data division unit for dividing the voice packet data with an uncompressed header into a plurality of portions when this necessity is generated, wherein each of the transmission units radiates each divided data into a space via each antenna, and transmits the data by spatial multiplexing.

A second voice packet transmission apparatus according to the present invention has: a first encoder for encoding a voice packet data with a compressed header using a first encoding rate; a second encoder for encoding a voice packet data with an uncompressed header using a second encoding rate which is greater than the first encoding rate; a transmission unit for transmitting encoded voice packet data using a plurality of subcarriers; a detection unit for detecting whether a necessity to send a voice packet with an uncompressed header is generated during transmitting a voice packet data encoded by the first encoder via the transmission unit; and a selection unit for inputting a voice packet data encoded by the second encoder into the transmission unit when this necessity is generated.

BRIEF DESCRIPTION OF THE DRAWINGS

FIG. 9 shows a variant form of the specification information SM;

FIG. 10 is a block diagram depicting the EUTRAN (Evolved UTRAN) system which is currently under consideration by the standardization group 3GPP;

FIG. 16 are diagrams depicting problems;

DESCRIPTION OF THE PREFERRED EMBODIMENTS (A) Overview of the Invention

Figure 1:
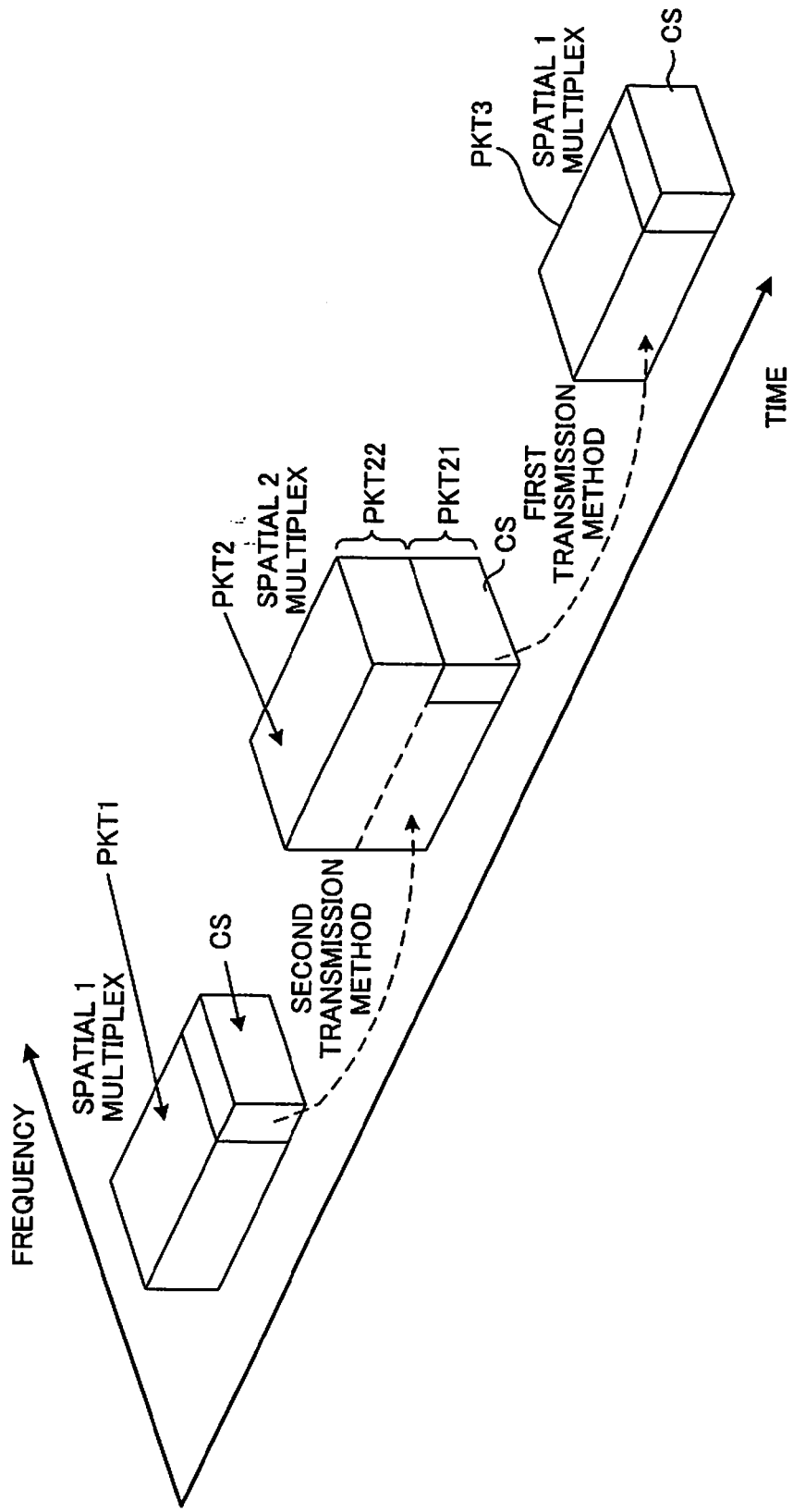
FIG. 1 is a first schematic diagram of the present invention.

FIG. 1 is a first schematic diagram of the present invention, and first a voice packet PKT1 with a compressed small sized header is sent using a plurality of subcarriers via one antenna (first transmission method). If a necessity to send a voice packet PKT2 with an uncompressed large sized header is generated during transmitting the voice packet PKT1 with a header, the packet data of this voice packet PKT2 is divided into a plurality of (two in FIG. 1) portions, and each divided data PKT21 and PKT22 is sent using the plurality of subcarriers via different antennas by spatial multiplexing (second transmission method).

A control signal CS is attached to each voice packet so that this control signal CS can instruct whether the next voice packet is sent based on the first transmission method or the second transmission method. Therefore the control signal CS attached to the voice packet PKT1 instructs to send the voice packet PKT2 based on the second transmission method, and the control signal CS instructs to send the voice packet PKT3 with the compressed header based on the first transmission method when sending the voice packet PKT2 with the uncompressed header.

A receive apparatus has a plurality of receive antennas, and demodulates the control signal CS from the received signal, identifies the transmission method by the control signal, switches the demodulation method based on this transmission method, and demodulates the receive data.

Figure 2:
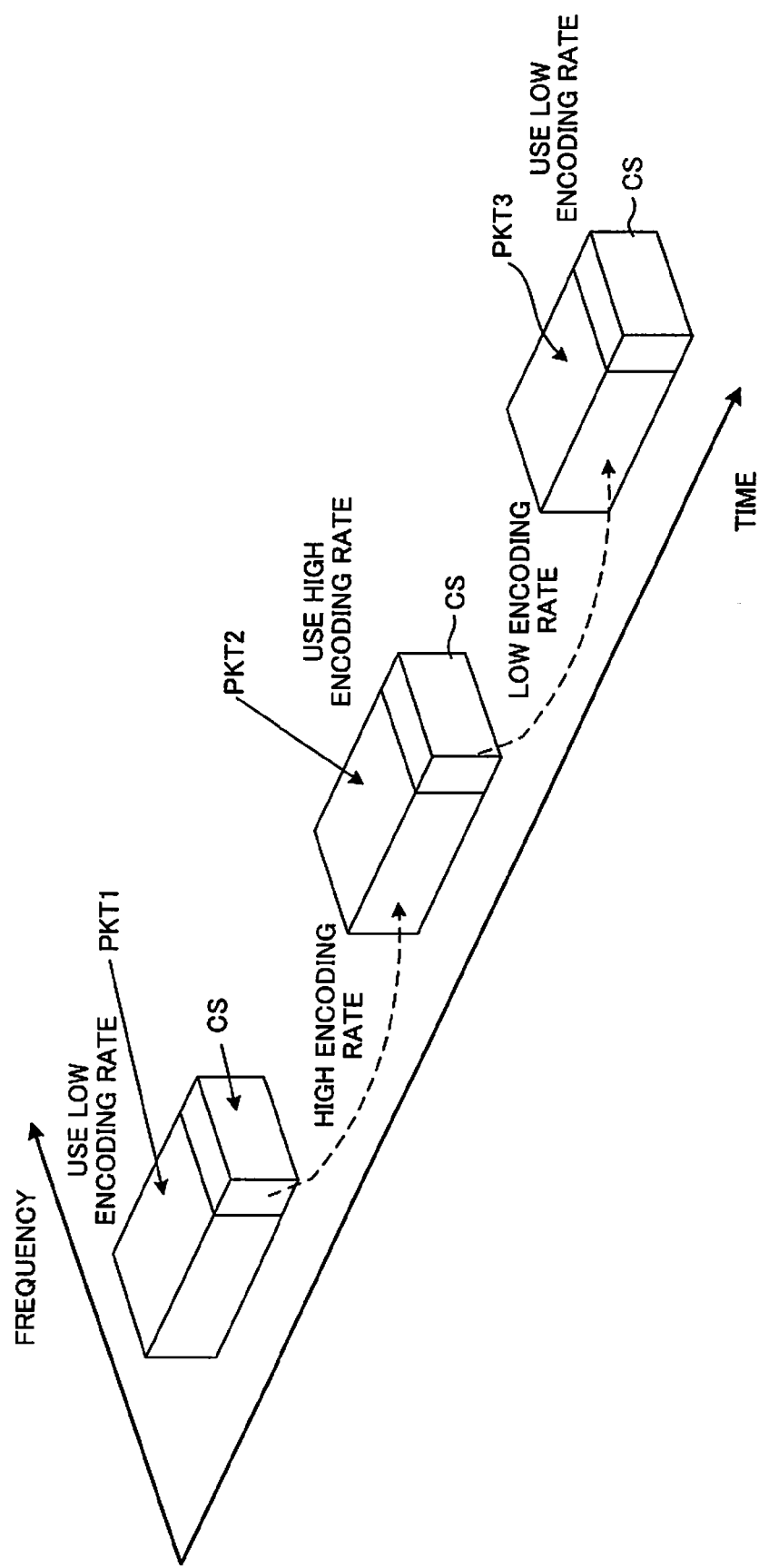
FIG. 2 is a second schematic diagram of the present invention.

FIG. 2 is a second schematic diagram of the present invention, and first a packet data of a voice packet PKT1 with a compressed small sized header is encoded with a first encoding rate (low encoding rate), and this encoded voice packet PKT1 with the compressed header is sent using a plurality of subcarriers. If a necessity to send a voice packet PKT2 with an uncompressed large sized header is generated during the above transmission, the packet data of this voice packet is encoded with a second encoding rate (higher encoding rate) which is greater than the first encoding rate, and this encoded voice packet data is sent using the plurality of subcarriers.

A control signal CS is attached to each voice packet so that this control signal CS can instruct whether the next voice packet data is encoded with the first encoding rate or second encoding rate. Therefore the control signal CS attached to the voice packet PKT1 instructs to encode the voice packet PKT2 with the second encoding rate (high encoding rate), and sends it. The control signal CS attached to the voice packet PKT2 instructs to encode the voice packet PKT3 with the first encoding rate (low encoding rate).

A receive apparatus demodulates the control signal from the received signal, identifies the encoding rate by the control signal, and switches the decoding method based on this encoding rate, and decodes the voice packet data.

In other words, if it is required to transmit data which cannot be contained in a transmission area in a case where transmission apparatus notified that data transmission is to be performed in this transmission area in a predetermined period, using a predetermined modulation method and predetermined encoding rate, the transmission apparatus creates a signal to notify that a new transmission area is added to the transmission area to send data by spatial multiplexing while maintaining the modulation method, or creates a signal to notify that data is transmitted in the transmission area with a higher encoding rate, and the transmission apparatus transmits the signal to a receiver in the predetermined transmission area before transmission of said data.

(B) First Embodiment (a) Transmission/Receive Control of First Embodiment

Figure 3:
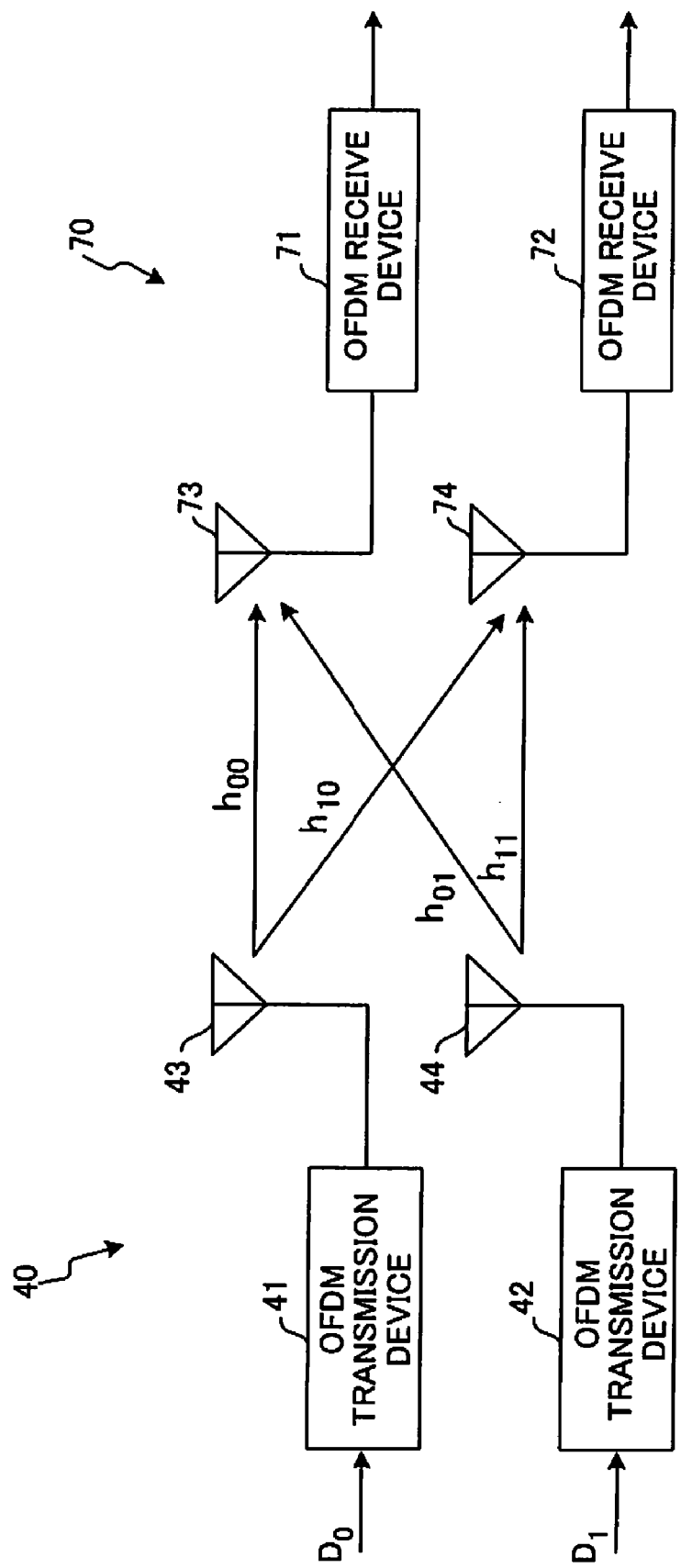
FIG. 3 is a diagram depicting a communication system of a first embodiment.

FIG. 3 is a diagram depicting a communication system of a first embodiment, where a voiced packet transmission apparatus 40 has two OFDM transmission apparatus 41 and 42, to which transmission antennas 43 and 44 are connected respectively. A voice packet receiving apparatus 70 has two OFDM receive apparatus 71 and 72 to which receive antennas 73 and 74 are connected respectively.

When data with a compressed header is sent, the voice packet transmission apparatus 40 sends a voice packet via the first OFDM transmission apparatus 41 and the antenna 43, and the voice packet receive apparatus 70 demodulates the packet data using the receive antenna 73 and OFDM receive apparatus 71. In other words, normal OFDM communication is performed using one transmission antenna and one receive antenna. When a data with a compressed header is transmitted, a same voice packet data may be sent from the antennas 43 and 44 (transmission diversity), so that the receive side performs the transmission diversity demodulation processing on the signal received by one receive antenna 73, and demodulates the voice packet data.

When a data with an uncompressed header is sent, the voice packet transmission apparatus 40 divides the voice packet data into two data strings, and sends each divided data string via the first and second OFDM transmission apparatus 41 and 42 and antennas 43 and 44 respectively by MIMO (Multiple Input Multiple Output). The first and second antennas 43 and 44 which are disposed not to correlate with each other, send the radio signal which is input, and this radio signal reaches the voice packet receive unit 70 via independent fading channel $h_{nm}$ (h=0 to 1, n=0 to 1), and is received by the two receive antennas 73 and 74. The OFDM receive apparatus 71 and 72 perform OFDM receive processing on the signal received by each receive antenna, and demodulate the voice packet data using a known MIMO signal processing.

(b) Voice Packet Transmission Apparatus

Figure 4:
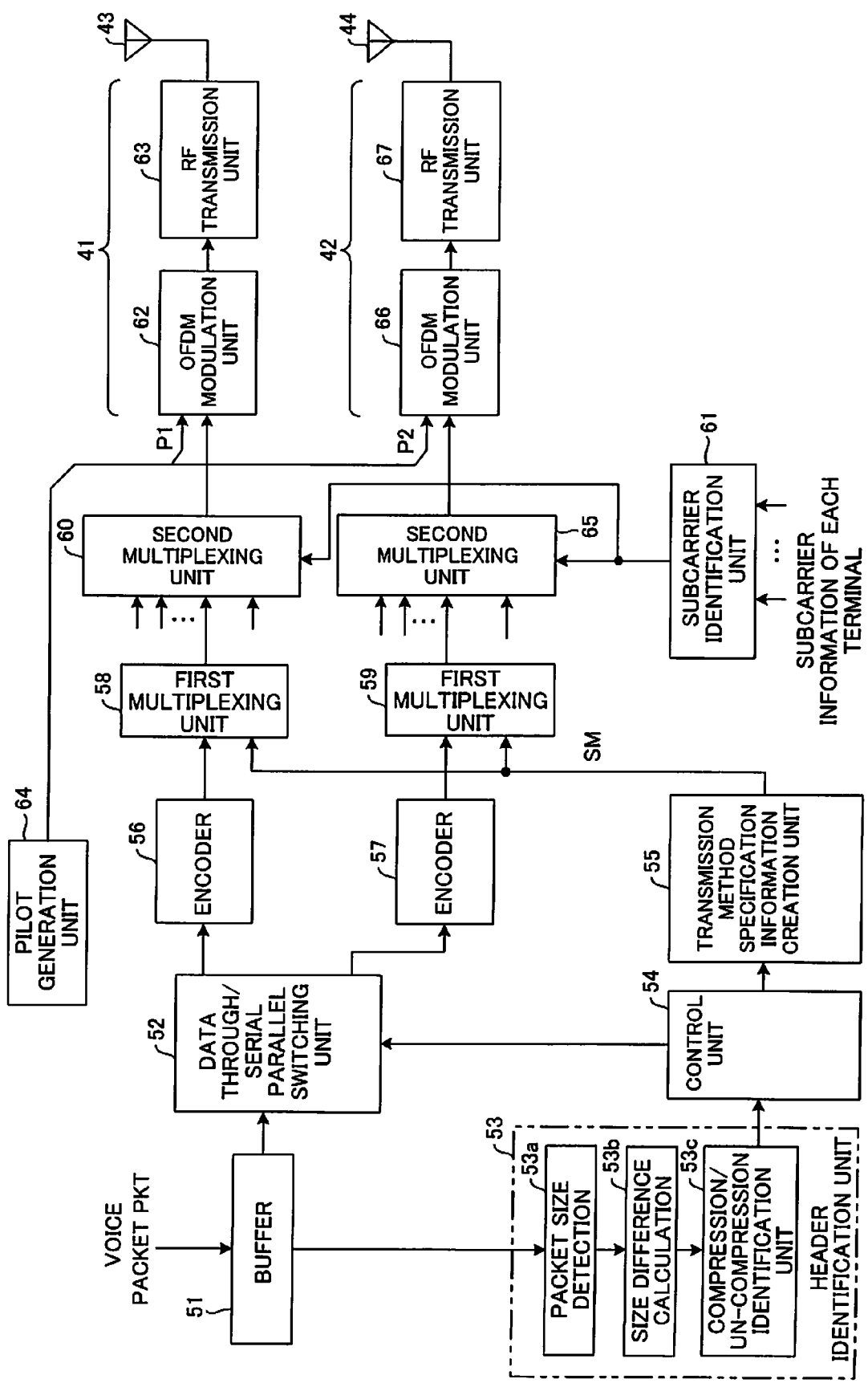
FIG. 4 is a block diagram depicting a voice packet transmission apparatus.

FIG. 4 is a block diagram depicting the voice packet transmission apparatus 40, where the same composing elements as FIG. 3 are denoted with the same symbols.

Figure 17:
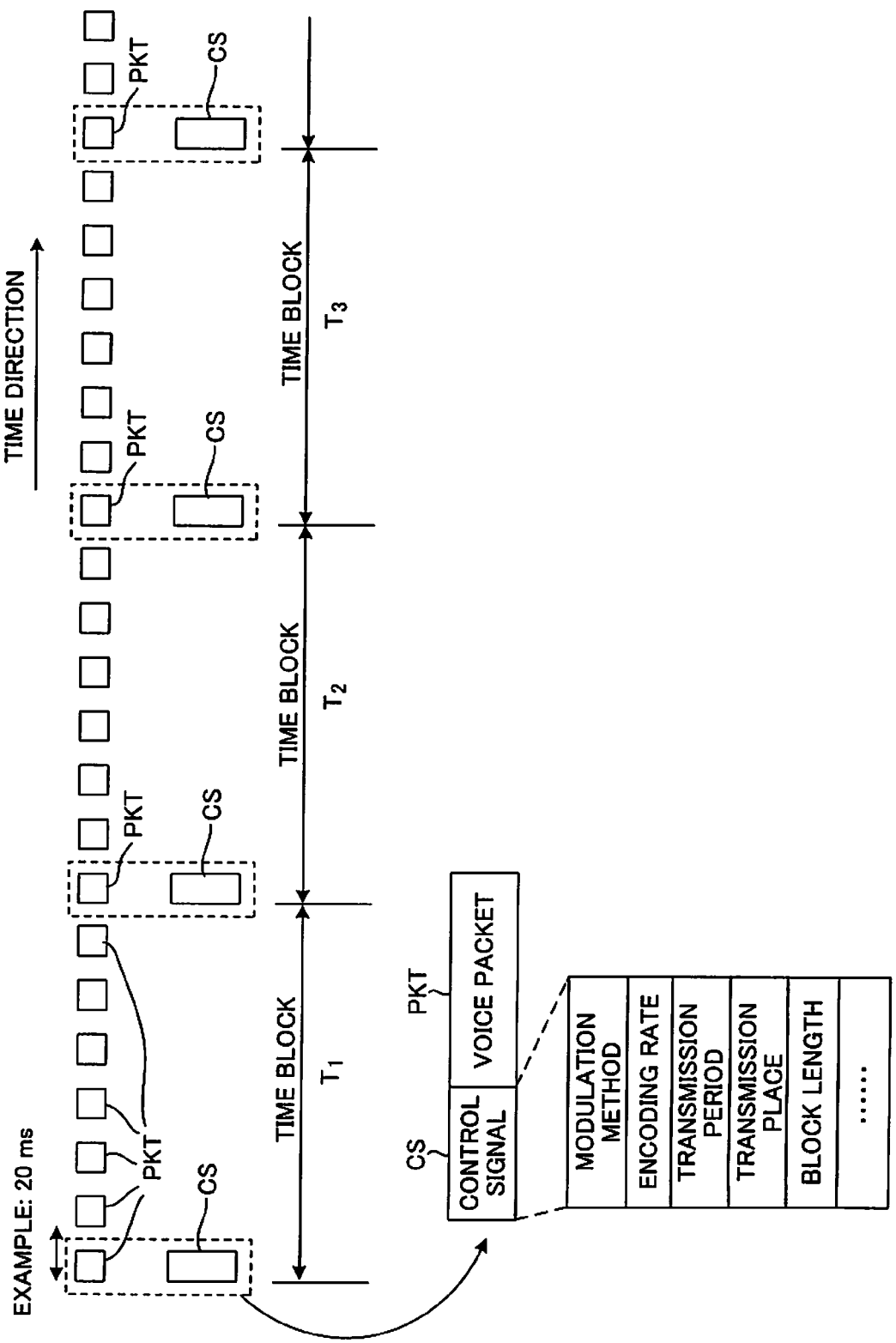
FIG. 17 is a diagram depicting a first voice packet transmission method which is proposed.
Figure 18:
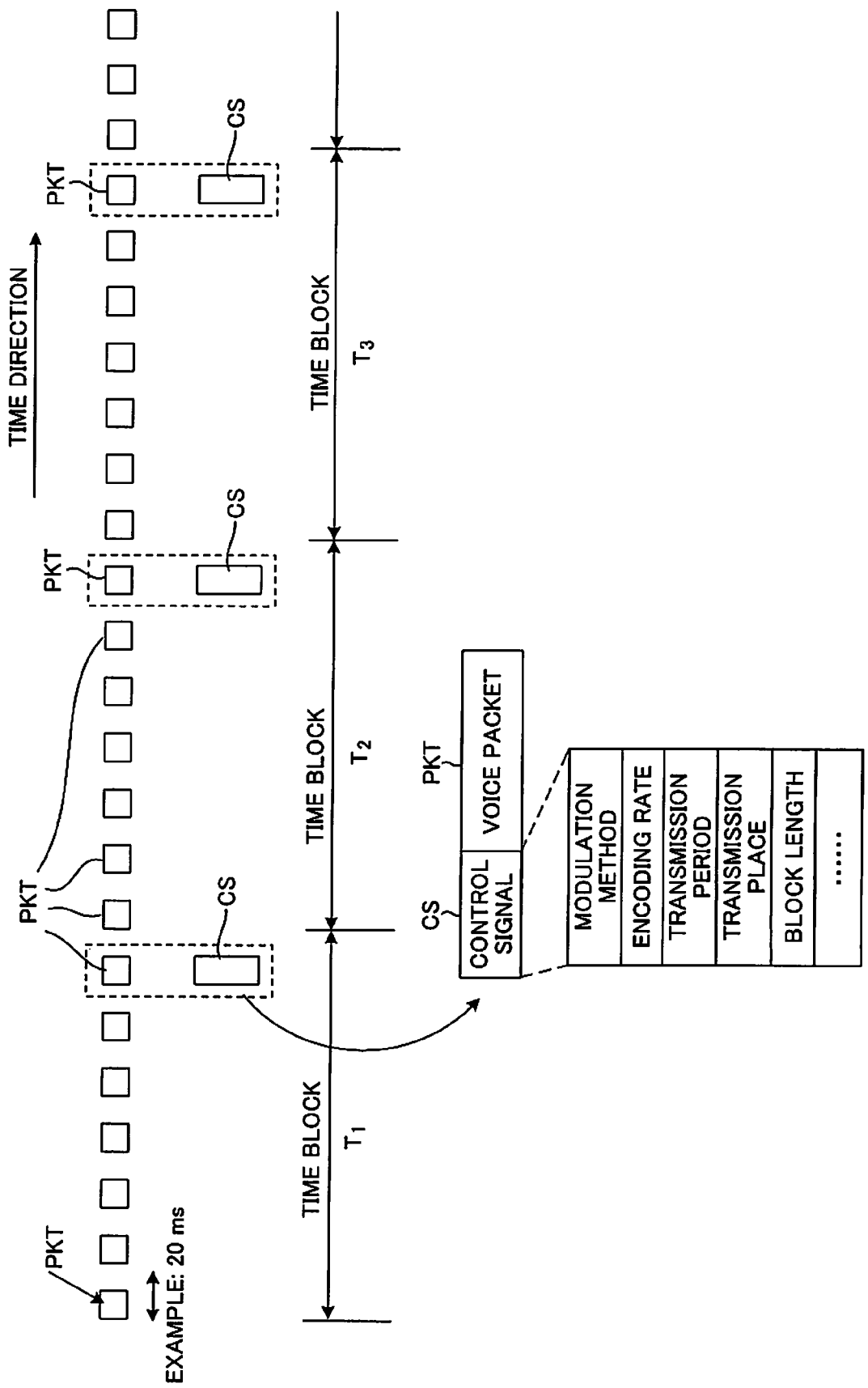
FIG. 18 is a diagram depicting a second voice packet transmission method which is proposed.
Figure 19:
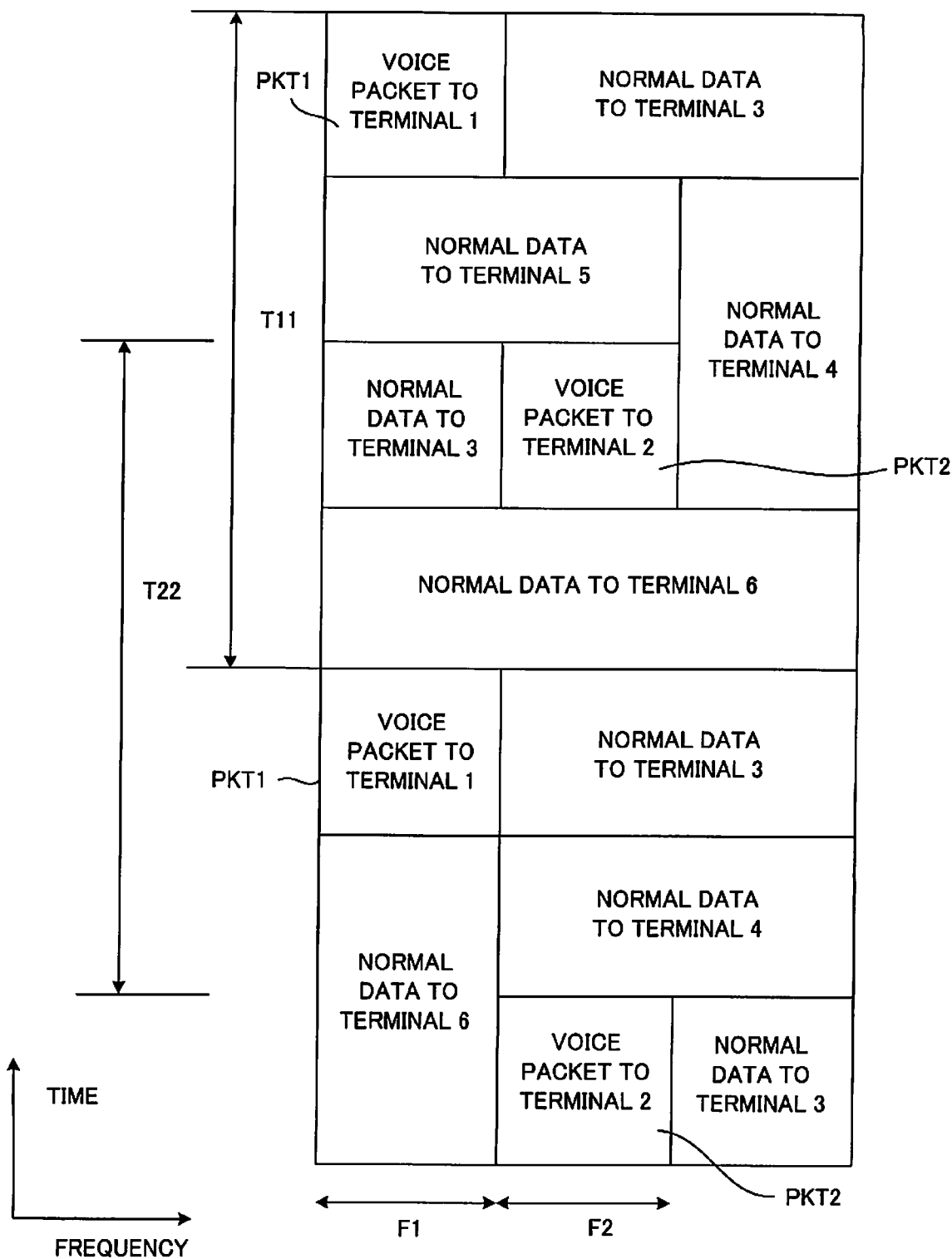
FIG. 19 is a diagram depicting voice packet sent in a predetermined period in a time block in a same subcarrier (subband).

A buffer 51 sequentially receives and stores a voice packet string (FIG. 17) addressed to a predetermined terminal, and inputs this voice packet PKT to a data through/serial-parallel switching unit 52 after the header compression identification completes. The voice packet PKT has a control signal portion CNT and a voice packet main body PKB, as shown in (A) and (B) of FIG. 5, for example. The control signal portion CNT includes one bit which indicates whether scheduling information SCD is present, where "1" indicates that the voice packet PKT includes the scheduling information, and "0" indicates that the voice packet PKT does not include the scheduling information. The scheduling information SCD includes timing, place in the frequency area (subcarrier information), modulation method and encoding rate.

In the header identification unit 53, a packet size detection unit 53a detects a packet size of a voice packet which was input, a size difference calculation unit 53b calculates a difference between the previous packet size and packet size determined this time, and a compression/uncompression identification unit 53c detects that a compressed header changed to an uncompressed header or vice versa when the difference is a set value or more. A control unit 54 instructs data through to the data through/serial-parallel switching unit 52 if the header of the voice packet is a compressed header, and instructs serial-parallel conversion if it is an uncompressed header. The control unit 54 also instructs a transmission method to a transmission method specification information creation unit 55.

If data through is instructed, the data through/serial-parallel switching unit 52 passes through the serial data of the voice packet with a compressed header which was input, and inputs it to the encoder 56 as is, and if serial-parallel conversion is instructed, the data through/serial-parallel switching unit 52 divides the serial data of the voice packet with an uncompressed header which was input, into two data strings (serial-parallel conversion), and inputs the two data strings to an encoder 56 and encoder 57 respectively. The encoders 56 and 57 encode the input data, and input it to first multiplexing units 58 and 59. The transmission method specification information creation unit 55 creates one bit transmission method specification information SM, and inputs it to the first multiplexing units 58 and 59 according to an instruction from the control unit 54. If the transmission method specification information a SM is "0", the header is a compressed header, which indicates that the packet is sent via one antenna (first transmission method), and if "1", the header is an uncompressed header, which indicates that the packet data is sent using two antennas by spatial multiplexing (second transmission method).

Case of Voice Packet with Compressed Header (First Transmission Method)

Figure 5:
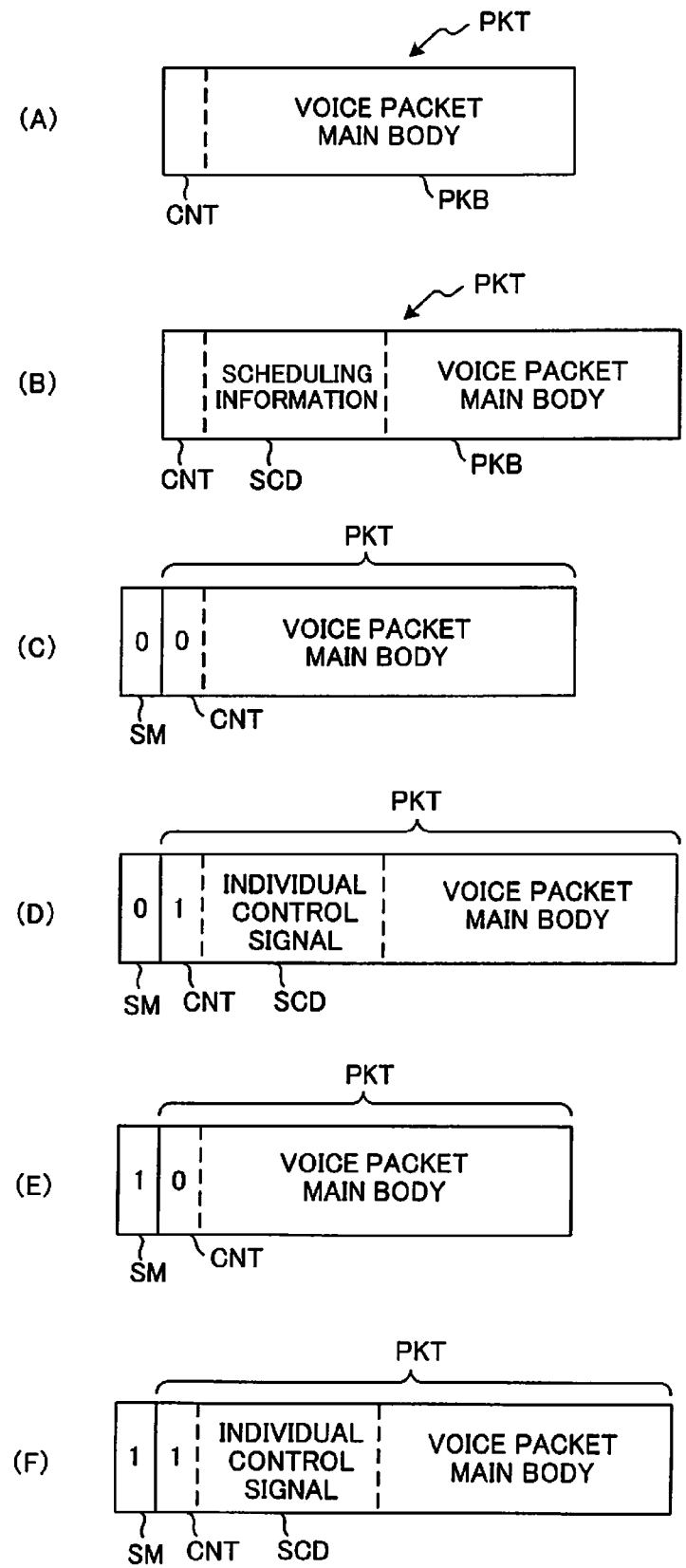
FIG. 5 are diagrams depicting voice packets and transmission method specification information SM.

If a header of a voice packet is compressed, the data through/serial-parallel switching unit 52 passes through the serial data of the voice packet with a compressed header which was input, and inputs it only to the encoder 56 as is, the encoder 56 encodes the packet data of this voice packet with the compressed header PKT, and the first multiplexing unit 58 multiplexes the transmission method specification information SM with the voice packet data PKT, as shown in (C) to (F) of FIG. 5, and inputs the multiplexed data to the second terminal multiplexing unit 60. (C) of FIG. 5 is a multiplexing result in the case when the combination of the transmission method specification information SM and control signal portion CNT is 0 and 0, (D) of FIG. 5 is the multiplexing result in the case of 0 and 1, (E) of FIG. 5 is the multiplexing result in the case of 1 and 0, and (F) of FIG. 5 is the multiplexing result in the case of 1 and 1.

A subcarrier identification unit 61 identifies subcarriers to send each data addressed to a terminal based on the subcarrier information included in the scheduling information SCD, and the second multiplexing unit 60 arranges each data addressed to terminal in the sequence of sub-carrier, and inputs data to the OFDM modulation unit 62.

An OFDM modulation unit 62 performs OFDM modulation on the voice packet with the transmission method specification information which was input from the second multiplexing unit 60, and a radio transmission unit 63 converts the OFDM signal, which is output from the OFDM modulation unit 62, into a radio signal, and sends it via one antenna 43. The OFDM modulation unit 62 also time-division multiplexes the pilot, which is generated from a pilot generation unit 64, with the voice packet data, performs OFDM modulation, and sends the multiplexed data.

Case of Voice Packet with Uncompressed Header (Second Transmission Method)

If a header of a voice packet is not compressed (uncompressed header), on the other hand, the data through/serial-parallel switching unit 52 divides the serial data of the voice packet with the uncompressed header which was input, into two data strings, and inputs them to the encoder 56 and encoder 57 respectively. The encoders 56 and 57 encode the input data, and input it to the first multiplexing units 58 and 59. The first multiplexing units 58 and 59 multiplex the transmission method specification information SM with the two divided packet data strings, and input the multiplexed data into the second multiplexing units 60 and 65. The first multiplexing unit 59 is not always necessary, but is used for transmission diversity.

The second multiplexing units 60 and 65 multiplex each data addressed to terminal based on the subcarrier information, just like the case of the first transmission method, and input the multiplexed data to the OFDM modulation units 62 and 66. The OFDM modulation unit 62 performs OFDM modulation on the divided data string with the transmission method specification information, which was input from the second multiplexing unit 60, and the radio transmission unit 63 converts the OFDM signal, which is output from the OFDM modulation unit 62, into a radio signal, and inputs it to the first antenna 43, and the OFDM modulation unit 66 performs OFDM modulation on the divided data string with the transmission method specification information, which was input from the second terminal multiplexing unit 65, and the radio transmission unit 67 converts the OFDM signal, which is output from the OFDM modulation unit 66, into a radio signal, and inputs it to the second antenna 44.

The OFDM modulation units 62 and 66 create pilot OFDM symbols so as to be orthogonal to each other, using the first and second pilots P1 and P2, which are generated by the pilot generation unit 64 respectively, and insert the pilot OFDM symbols into the data OFDM symbols.

The first and second antennas 43 and 44 send the radio signals which were input, and these radio signals pass through the independent fading channels $h_{nm}$ (m=0 to 1, n=0 to 1). These radio signals are multiplexed in the space, and are received by a receive apparatus which has two receive antennas 73 and 74. The transmission area simply becomes double because of the spatial multiplexing, so the transmittable data volume also doubles.

(c) Voice Packet Receive Apparatus

Figure 6:
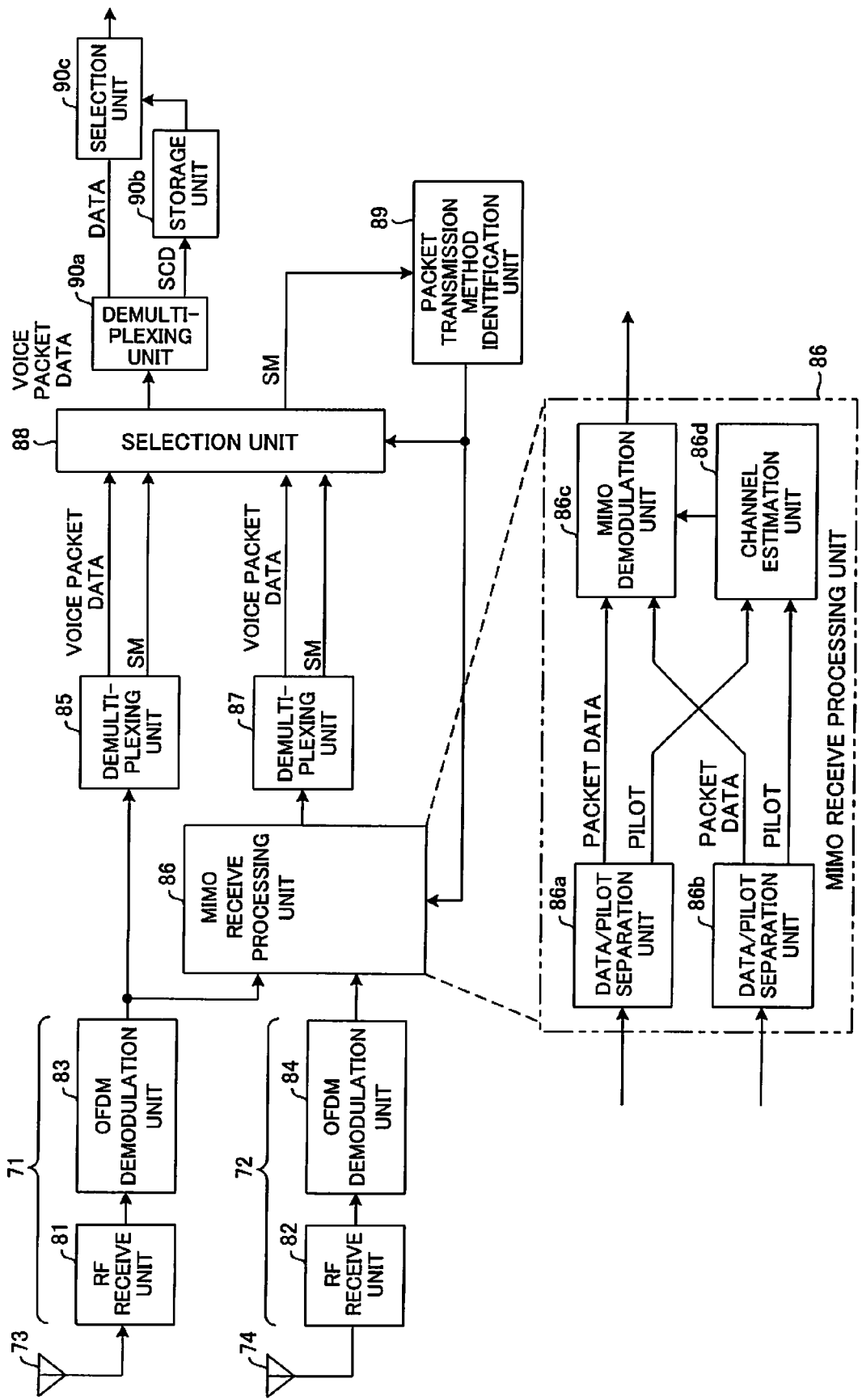
FIG. 6 is a block diagram depicting a voice packet receive apparatus.

FIG. 6 is a block diagram depicting a voice packet receive apparatus 70, where the same composing elements as FIG. 3 are denoted with the same symbols.

Figure 15:
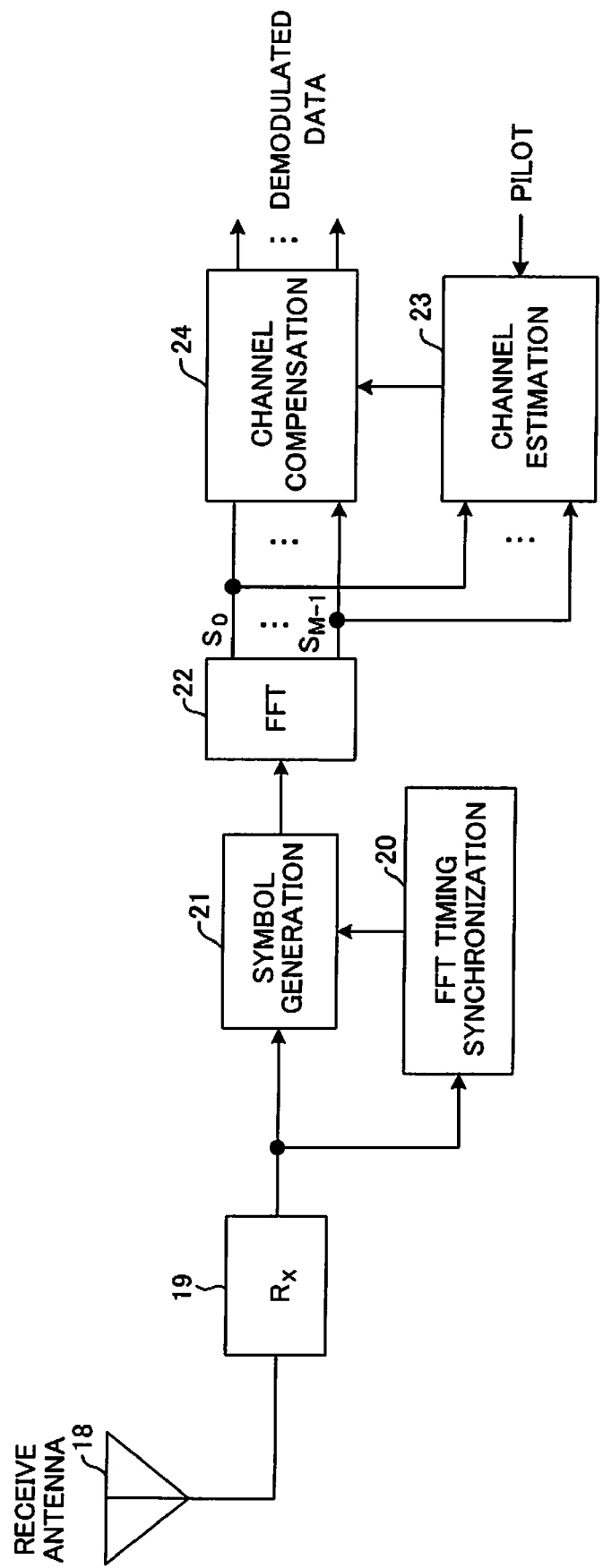
FIG. 15 is a block diagram depicting an OFDM receive apparatus.

The radio receive units (RF receive unit) 81 and 82 convert the radio signals, which were received via the first antennas 73 and 74, into base band signals, and input them into the OFDM demodulation units 83 and 84, and the OFDM demodulation units 83 and 84 execute the OFDM demodulation processing described in FIG. 15, and output the demodulation result. A demultiplexing unit 85 demultiplexes the voice packet data and transmission method specification information SM. In the case when MIMO transmission is performed, MIMO receive processing unit 86 performs MIMO receive processing using the output signals of the OFDM demodulation units 83 and 84, and demodulates the transmission data. A demultiplexing unit 87 demultiplexes the voice packet data and transmission method specification information SM based on the MIMO receive processing, and if it is the first transmission method, that is, if the header of the voice packet is compressed, a selection unit 88 selects the voice packet data and the transmission method specification information SM which are output from the demultiplexing unit 85, and if it is the second transmission method, that is, if the header of the voice packet is not compressed, the selection unit 88 selects the voice packet data and transmission method specification information SM which are output from the demultiplexing unit 87. A packet transmission method identification unit 89 identifies a transmission method based on the transmission method specification information SM, and inputs this method to the MIMO receive processing unit 86 and the selection unit 88. A demultiplexing unit 90a demultiplexes and outputs the data and scheduling signal SCD, a storage unit 90b stores the latest scheduling signal SCD, and a selection unit 90c selects data from the position indicated by the subcarrier information included in the scheduling signal SCD, and outputs the data. Each modulation unit and decoding unit performs demodulation processing and decoding processing based on this scheduling signal.

In the MIMO receive processing unit 86, data/pilot separation units 86a and 86b separate the packet data and pilot signal, input the packet data to an MIMO demodulation unit 86c, and input the pilot signal to a channel estimation unit 86d. The channel estimation unit 86d acquires a channel estimation value for each carrier using the pilot signal. In other words, the channel estimation unit 86d performs the correlation operation of a received pilot signal from each receive antenna 73 and 74 and a known pilot signal, and acquires a channel estimation value. Then the channel estimation unit 86d inputs a channel estimation value in each subcarrier into the MIMO demodulation unit 86c for each antenna. The MIMO demodulation unit 86c performs a known MIMO channel separation for each subcarrier, using the receive data signal of each receive antenna and the channel estimation value, performs P/S conversion on each data stream acquired by the MIMO channel demultiplexing operation, and outputs the converted data stream. In the case of MIMO reception, each OFDM demodulation unit 83 and 84 does not perform channel estimation and channel compensation.

If the second transmission method is instructed by the transmission method specification information SM when the voice packet data is initially transmitted to the voice packet receive apparatus 70 using the first transmission method, the packet transmission method identification unit 89 instructs the MIMO receive processing unit 86 to start MIMO receive processing, and also instructs the selection unit 88 to select the voice packet data and transmission method specification information SM which are output from the demultiplexing unit 87. Thereby the MIMO receive processing is performed and data which was sent by spatial multiplexing is demodulated thereafter. If the first transmission method is instructed by the transmission method specification information SM when the voice packet data is being sent using the second transmission method, the packet transmission method identification unit 89 instructs the MIMO receive processing unit 86 to stop the MIMO receive processing, and also instructs the selection unit 88 to select the voice packet data and transmission method specification information SM which are output from the demultiplexing unit 85. Thereby normal receive processing is performed thereafter, and packet data sent via one antenna is demodulated.

According to the present invention, even if a situation to send a large sized voice packet with a full sized header is suddenly generated, this large sized voice packet can be sent via spatial multiplex transmission. In this case, the reception side can maintain the receive method of extracting only signals transmitted in a predetermined subcarrier, even if the situation to send a voice packet with an uncompressed header is generated.

Also according to the present invention, even if a large frequency band to send the voice packet with a full sized header is not secured, transmission capability can be increased by spatial multiplex transmission whereby a voice packet with a full sized header can be sent.

(c) Second Embodiment (a) Voice Packet Transmission Apparatus

In the first embodiment, the data transmission capability is increased by transmitting data via a plurality of antennas and performing spatial multiplexing, but in the second embodiment, the data transmission capability is increased by encoding data with a high encoding rate.

Figure 7:
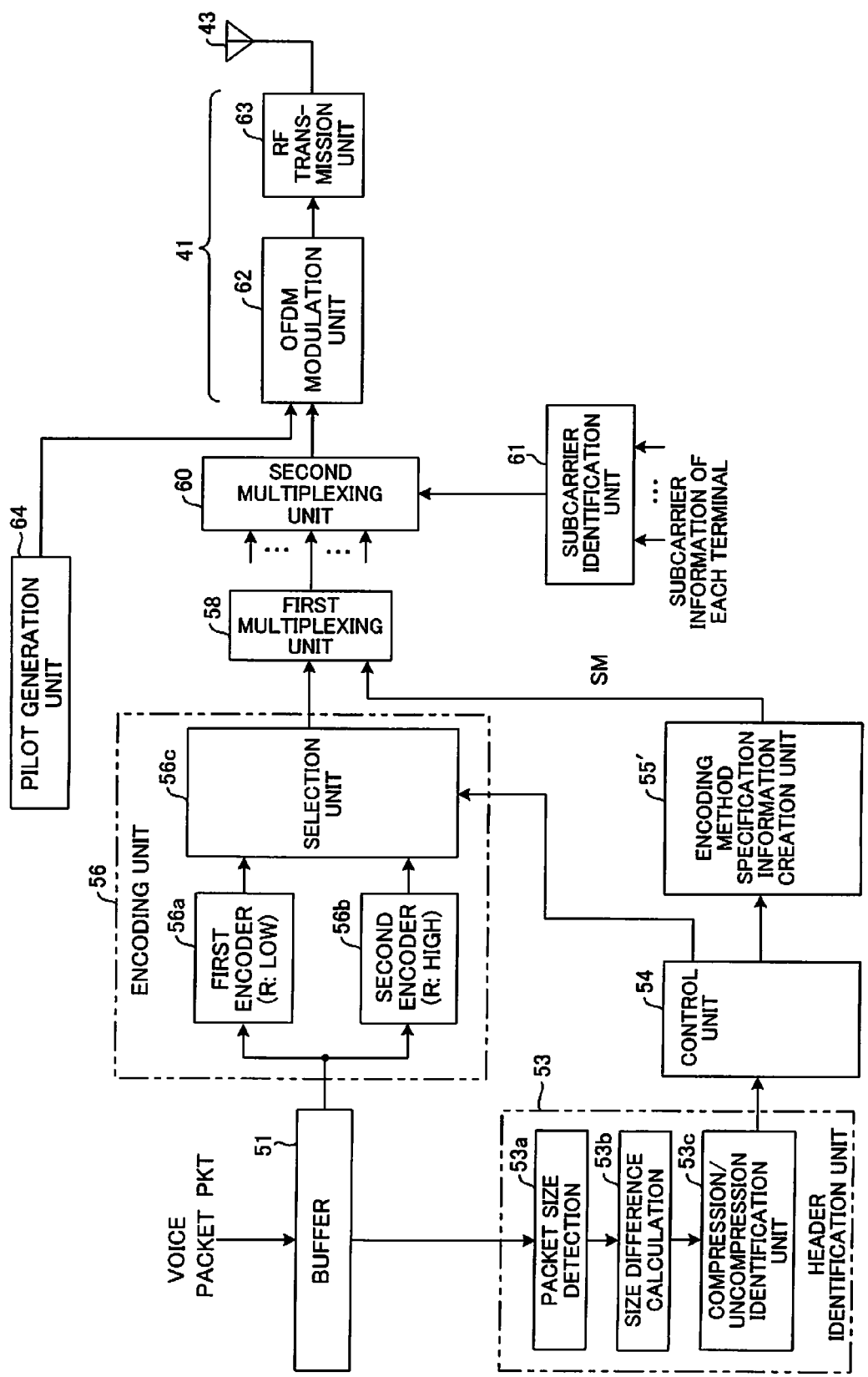
FIG. 7 is a block diagram depicting a voice packet transmission apparatus of a second embodiment.

FIG. 7 is a block diagram depicting a voice packet transmission apparatus according to the second embodiment, where the same composing elements as the voice packet transmission apparatus of the first embodiment in FIG. 4 are denoted with the same symbols. In FIG. 7, the differences from the first embodiment are as follows.

(1) The configuration to perform spatial multiplex transmission is omitted.

(2) A first encoder 56a for encoding data by an encoding method using a low encoding rate, a second encoder 56b for encoding data by an encoding method using a high encoding rate, and a selection unit 56c are disposed in the encoding unit 56.

(3) If a header of a voice packet is compressed, the voice packet data encoded by the encoding method using a low encoding rate is OFDM-modulated and sent, and if a header of a voice packet is not compressed, the voice packet data encoded by the encoding method using a high encoding rate is OFDM-modulated and sent.

The encoding rate R is $R=Sd/(Sd+Sc)$ where Sd is a size of data and Sc is a size of an encoding portion which is attached for encoding, and an encoding method using a small encoding rate R is defined as an encoding method with a low encoding rate, and an encoding method using a large encoding rate R is defined as an encoding method with a high encoding rate. According to the encoding method with a low encoding rate, the error detection and correction capability can be increased, but the data transfer capability decreases. If a header is compressed, the size of the voice packet is small, so this packet is encoded by the encoding method with a low encoding rate and sent. According to an encoding method with a high encoding rate, on the other hand, the error detection and correction capability decreases, but the data transfer capability can be increased. If a header is not compressed, the size of the voice packet is large, so this packet is encoded by an encoding method with a high encoding rate and sent.

A buffer 51 sequentially receives and stores the voice packet string (FIG. 17) addressed to a predetermined terminal, and inputs the voice packet PKT to the first and second encoders 56a and 56b of the encoding unit 56 after the header compression identification completes. The voice packet PKT has a control signal portion CNT and a voice packet main body PKB, as shown in (A) of FIG. 5.

In the header identification unit 53, a packet size determination unit 53a determines a packet size of a voice packet which was input, a size difference calculation unit 53b calculates the difference of a previous packet size and packet size determined this time, and a compression/uncompression identification unit 53c detects that a compressed header changed to an uncompressed header, or vice versa, when the difference is a set value or more. If the header of the voice packet is a compressed header, a control unit 54 instructs the selection unit 56c of the encoding unit 56 to select a voice packet data encoded by the first encoder 56a with a low encoding rate, and if it is an uncompressed header, the control unit 54 instructs the selection unit 56c to instruct to select a voice packet data encoded by the second encoder 56b with a high encoding rate. The control unit 54 also instructs the encoding method to an encoding method specification information creation unit 55'.

If a header of the voice packet is a compressed header, the encoding unit 56 outputs the voice packet data encoded by the first encoder 56a with a low encoding rate, and if it is an uncompressed header, the encoding unit 56 outputs the voice packet data encoded by the second encoder 56b with a high encoding rate. The encoding method specification information creation unit 55' creates one bit of encoding method specification information SM according to the instruction from the control unit 54, and inputs it to the first multiplexing unit 58. If the encoding method specification information SM is "0", it means an encoding method with a low encoding rate, and if "1", it means an encoding method with a high encoding rate.

A carrier identification 61 identifies subcarriers to transmit each data addressed to terminal based on the subcarrier information included in the scheduling information SCD, and the second multiplexing unit 60 arranges each data addressed to terminal in the sequence of subcarrier, and inputs it to an OFDM modulation unit 62.

The OFDM modulation unit 62 performs OFDM modulation on a voice packet with transmission method specification information which was input from the second multiplexing unit 60, and a radio transmission unit 63 converts the OFDM signal, which is output from the OFDM modulation unit 62, into a radio signal, and sends it via one antenna 43. The OFDM modulation unit 62 time-division multiplexes pilots generated from a pilot generation unit 64 into a voice packet data, then performs OFDM modulation, and sends the data.

(c) Voice Packet Receive Apparatus

Figure 8:
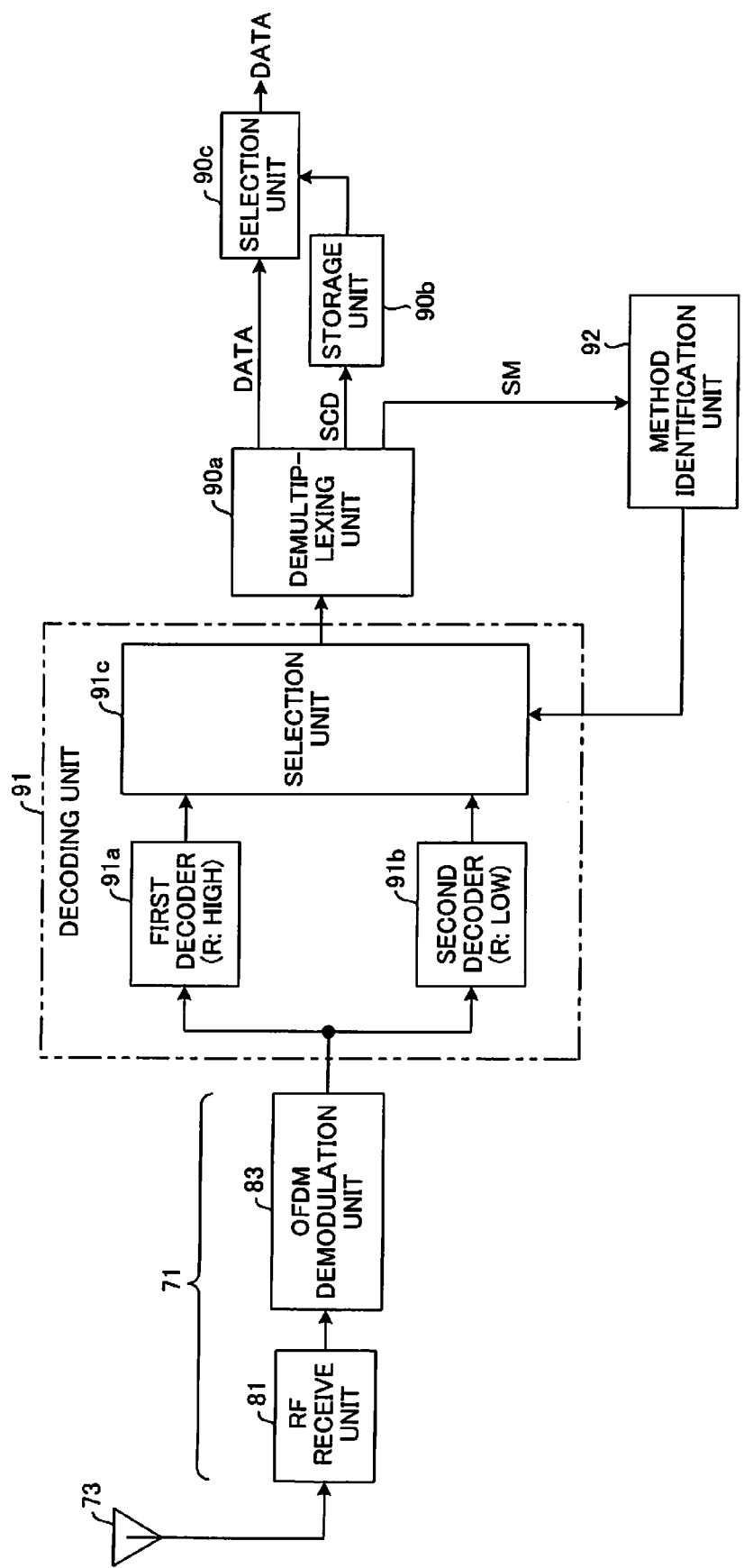
FIG. 8 is a block diagram depicting a voice packet receive apparatus of a second embodiment.
Figure 11:
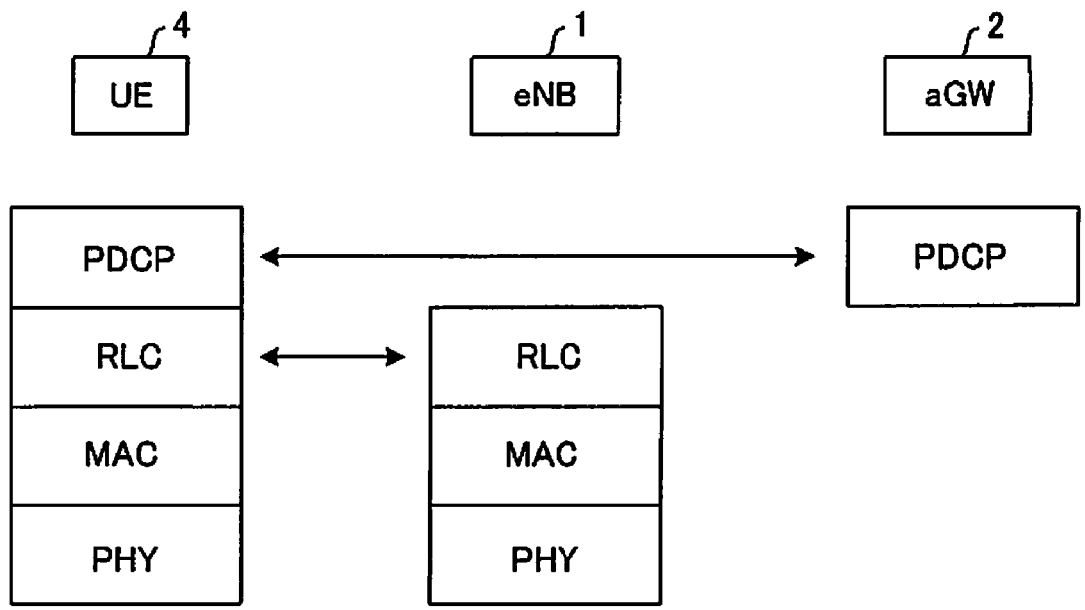
FIG. 11 is a diagram depicting a protocol stack.
Figure 12:
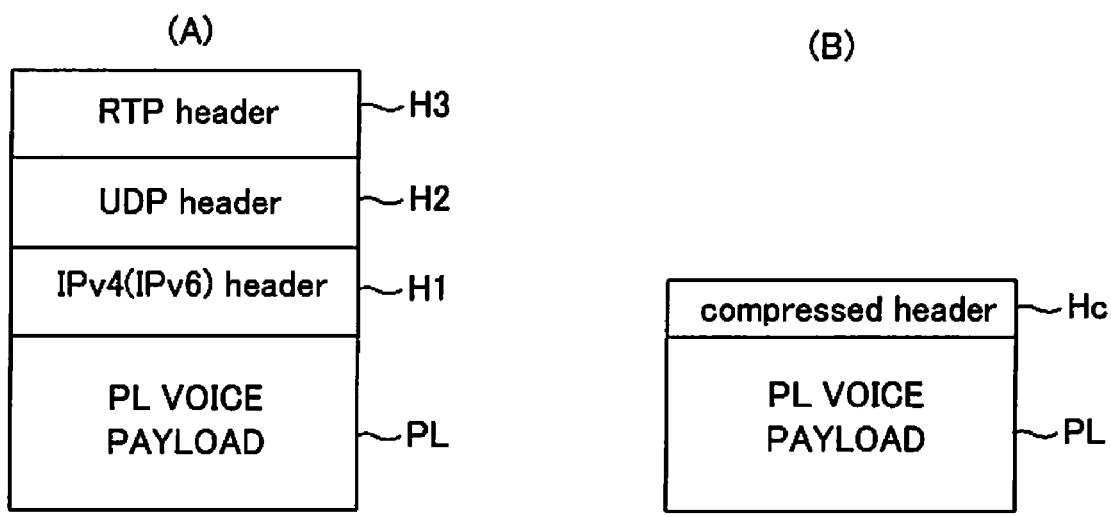
FIG. 12 is a diagram depicting the header compression.
Figure 13:
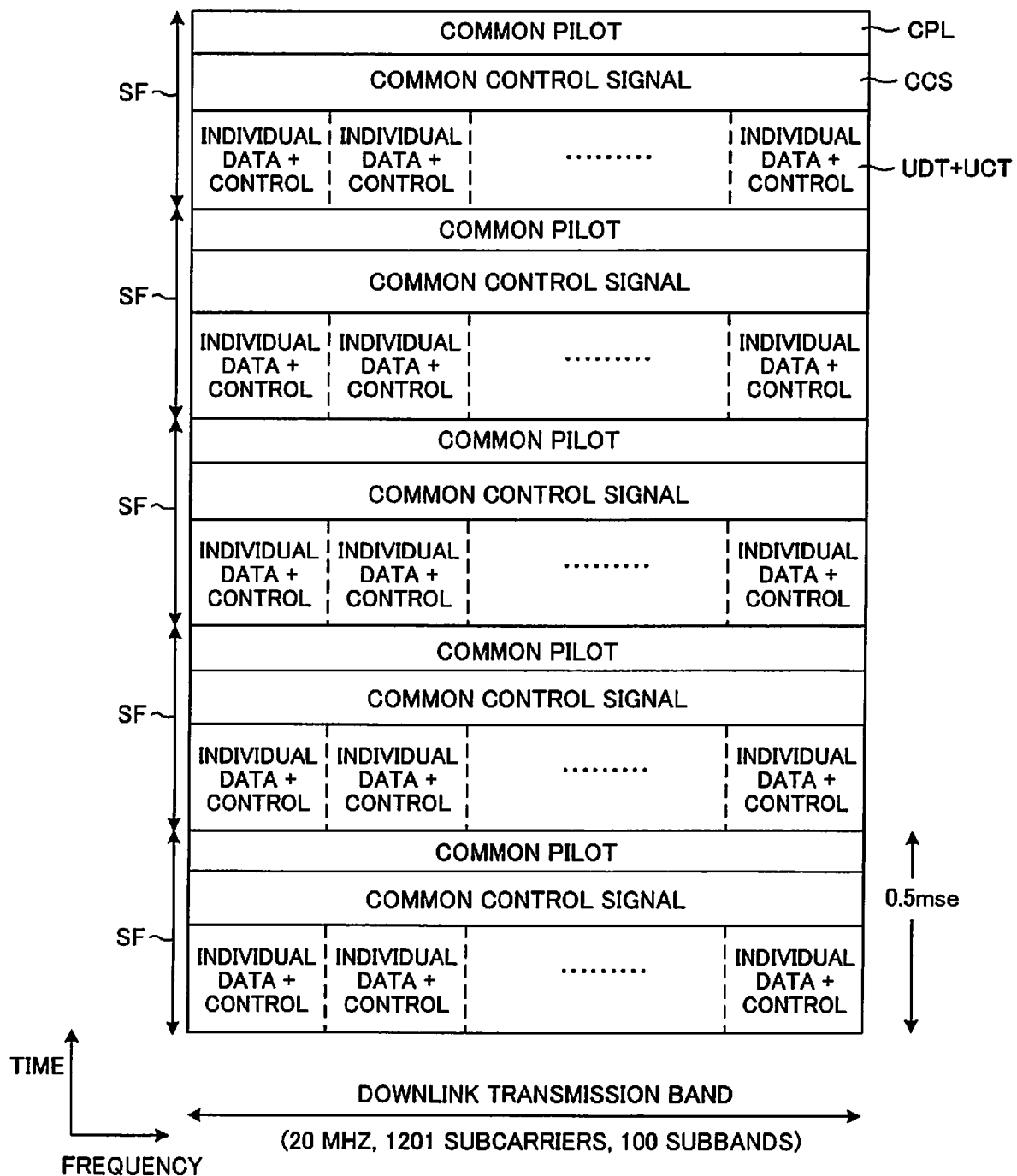
FIG. 13 is a diagram depicting a subframe in the downlink of a radio access unit of EUTRAN.
Figure 14:
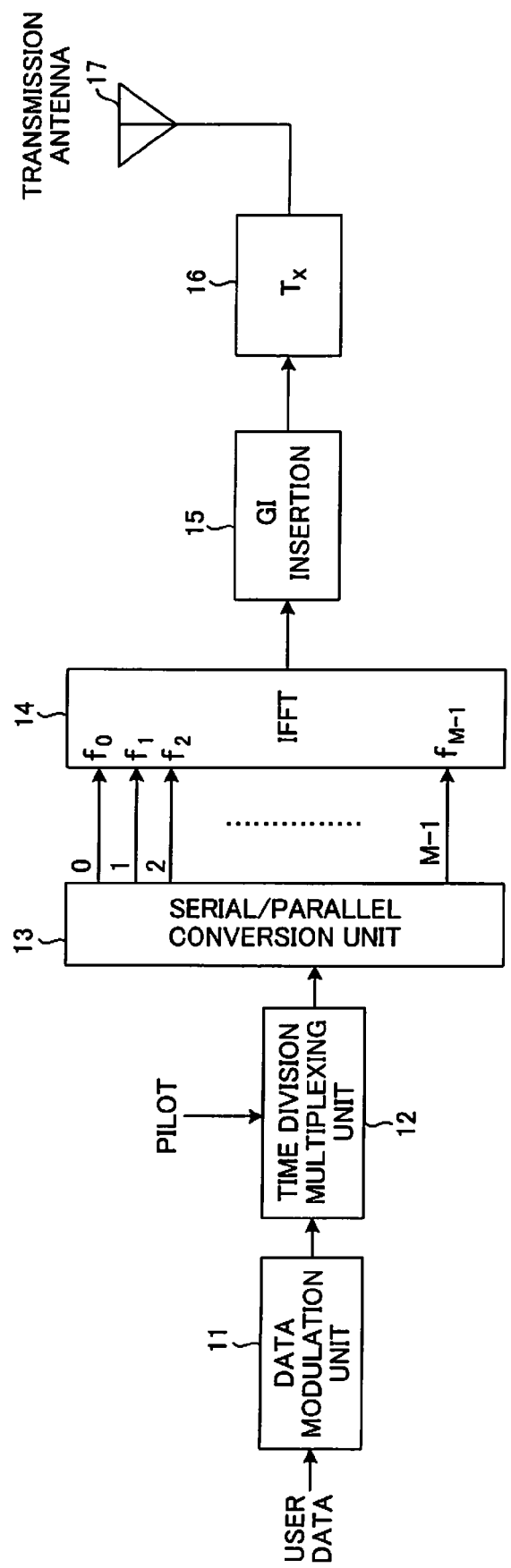
FIG. 14 is a block diagram depicting a transmission apparatus in an OFDM communication system.

FIG. 8 is a block diagram depicting a voice packet receive apparatus according to the second embodiment, where composing elements the same as FIG. 3 are denoted with the same symbols.

A radio receive unit 81 inputs a radio signal received by a first antenna 73 into an OFDM demodulation unit 83 as a base band signal, the OFDM demodulation unit 83 executes the OFDM demodulation processing described in FIG. 15, and outputs the demodulation result. A decoding unit 91 has a first decoder 91a for decoding a voice packet data encoded with a low encoding rate, a second decoder 91b for decoding a voice packet data encoded with a high encoding rate, and a selection unit 91c for selecting data decoded by one decoder.

A demultiplexing unit 90a separates packet data, scheduling information SCD and encoding method specification information SM from the decoded data which was output from the decoding unit, and an encoding method identification unit 92 identifies an encoding method based on the encoding method specification information SM, and instructs a selection unit 91c to select a decoding result according to the encoding method. A storage unit 94b stores the latest scheduling signal SCD, and the selection unit 90c selects data based on the position indicated by the subcarrier information included in the scheduling signal SCD.

In the voice packet receive apparatus, if a voice packet data encoded using an encoding method with a low encoding rate (voice packet data with a compressed header) is initially transmitted, the decoding unit 91 outputs a decoding result decoded by the first decoder 91a. If an encoding method with a high encoding rate is instructed by the encoding method specification information SM in this state, the encoding method identification unit 92 instructs the selection unit 91c to select a voice packet data which is output from the second decoder 91b. Thereby the decoder 91 outputs the decoding result decoded by the second decoder 91b thereafter.

If the encoding method with a low encoding rate is instructed by the encoding method specification information SM, the encoding method identification unit 92 instructs the selection unit 91c to select a voice packet data which is output from the first decoder 91a. Thereby the decoder 91 outputs the decoding result decoded by the first decoder 91a thereafter.

According to the present invention, even if a situation to send a large sized voice packet with a full sized header is suddenly generated, this large sized voice packet can be sent by encoding with a high encoding rate so as to increase the transmission capability. In this case, the reception side can maintain a receive method of extracting only signals transmitted in a predetermined subcarrier, even if a situation to send a voice packet with an uncompressed header is generated.

Also according to the present invention, even if a large frequency band to send the voice packet with a full sized header is not secured, the voice packet with full sized header can be sent by encoding with a high encoding rate so as to increase the transmission capability.

In the first and second embodiments, the specification information SM is one bit, and this one bit specifies a transmission method or an encoding method, but the specification information SM may be two bits, so that a transmission method and an encoding rate can be specified simultaneously, as shown in FIG. 9. In the case of FIG. 9, "00" indicates the first transmission method with a low encoding rate, and "01" indicates the second transmission method (spatial multiplex transmission) with a low encoding rate, and "11" indicates the first transmission method with a high encoding rate. The first transmission method is normal communication via one transmission antenna and one receive antenna, or communication via two transmission antennas and one receive antenna (transmission diversity).

In the first embodiment, the case of two transmission antennas and two receive antennas was described, but the number of antennas can be arbitrarily changed only if spatial multiplex transmission is possible.

In the first and second embodiments, the present invention is applied to the case of OFDM communication, but the present invention is not limited to this communication.

EFFECTS OF THE INVENTION

According to the present invention, even if a situation to send a large sized voice packet with a full sized header is suddenly generated, this large sized voice packet can be sent.

According to the present invention, a voice packet with full sized header can be sent, even if a large frequency band to send the voice packet with a full sized header is not secured.

What is claimed is:

1. A voice packet transmission method for transmitting a voice packet with a header, comprising:
    transmitting a voice packet with a compressed header, using a plurality of subcarriers via a set of antennas;
    detecting whether a necessity to send a voice packet with an uncompressed header is generated during said transmission of the voice packet with a compressed header;
    dividing said voice packet data with the uncompressed header into a plurality of portions when said necessity is generated;
    transmitting each divided data, using said plurality of subcarriers via multiple antennas by spatial multiplexing,
    and attaching a control signal that indicates whether a subsequent voice packet is transmitted by said spatial multiplexing, to each voice packet.

2. The voice packet transmission method according to claim 1, further comprising detecting a size of a voice packet and judging whether said voice packet is a voice packet with a compressed header or a voice packet with an uncompressed header, based on said packet size.

3. The voice packet transmission method according to claim 1, further comprising demodulating said control signal from a receive signal, and demodulating receive data by switching a demodulation method for the receive signal based on said control signal.

4. A voice packet transmission apparatus for transmitting a voice packet with a header, comprising:
    two or more OFDM transmission units transmitting voice packet data with compressed and uncompressed headers;
    two or more antennas transmitting radio signals which are output from each transmission unit into a space;
    a detector detecting whether a necessity to send a voice packet with an uncompressed header is generated during transmitting a voice packet with a compressed header;
    a packet processor dividing said voice packet data with the uncompressed header into a plurality of portions when said necessity is generated, wherein each of said transmission units radiates each divided data into a space via each antenna, and transmits said data by spatial multiplexing;
    and the packet processor attaches a control signal that indicates whether a subsequent voice packet is transmitted by said spatial multiplexing, to each voice packet.

5. The voice packet transmission apparatus according to claim 4, further comprising a header compression/un-compression judgment unit which detects a size of a voice packet, and judges whether said packet is a voice packet with a compressed header or a voice packet with an uncompressed header, based on said packet size.

6. The voice packet transmission apparatus according to claim 4, wherein the receive side demodulates said control signal from a receive signal, and demodulates receive data by switching a demodulation method for the receive signal based on said control signal.

* * * * *